US008225545B1

(12) United States Patent
Collins

(10) Patent No.: US 8,225,545 B1
(45) Date of Patent: Jul. 24, 2012

(54) LANDSCAPE HEATED COVER APPARATUS

(76) Inventor: Clinton Collins, Meza, AZ (US)

(*) Notice: Subject to any disclaimer, the term of this patent is extended or adjusted under 35 U.S.C. 154(b) by 0 days.

(21) Appl. No.: 13/211,458

(22) Filed: Aug. 17, 2011

(51) Int. Cl.
A01G 13/02 (2006.01)

(52) U.S. Cl. .......... 47/23.3; 47/29.5

(58) Field of Classification Search .......... 47/19.2, 47/20.1, 23.1, 23.2, 23.3, 29.1, 29.4, 29.5, 47/29.6, 29.7, 17, 32.3, 69, 2; D11/145
See application file for complete search history.

(56) References Cited

U.S. PATENT DOCUMENTS

| 1,446,416 | A | * | 2/1923 | Curtiss | 47/23.2 |
| 1,820,040 | A | * | 8/1931 | Zuckerman | 47/23.3 |
| 2,006,562 | A | * | 7/1935 | Scheu | 47/2 |
| 4,265,049 | A | * | 5/1981 | Gorewitz | 47/29.1 |
| 4,267,665 | A | * | 5/1981 | Wallace et al. | 47/29.1 |
| 4,646,467 | A | * | 3/1987 | Morrisroe | 47/20.1 |
| 5,832,660 | A | * | 11/1998 | Posa | 47/20.1 |
| 6,088,953 | A | * | 7/2000 | Morgan | 47/31 |
| 6,115,960 | A | * | 9/2000 | Posa | 47/20.1 |
| 6,698,135 | B1 | * | 3/2004 | Robbins | 47/29.7 |
| 7,117,633 | B2 | * | 10/2006 | Schmidt | 47/23.3 |
| 7,533,487 | B1 | * | 5/2009 | Mantkowski et al. | 47/2 |
| 2002/0046484 | A1 | * | 4/2002 | Lundgren | 47/29.6 |
| 2005/0076561 | A1 | * | 4/2005 | Schmidt | 47/23.3 |
| 2005/0086858 | A1 | * | 4/2005 | Schmidt | 47/20.1 |
| 2009/0293349 | A1 | * | 12/2009 | Dunbar | 47/20.1 |

* cited by examiner

Primary Examiner — T. Nguyen

(57) ABSTRACT

A landscaping cover operable to be superposed a tree or a bush that functions to maintain a temperature that is greater than that of its environmental surroundings. The landscaping cover includes a flexible body that is generally planar in manner that can be adapted to cover a variety of different sizes of plants or trees. The landscape cover includes a plurality of heating elements that are disposed throughout the body. The landscape cover additionally includes a plurality of stakes that are electrically coupled to the heating elements and are operable to increase the ground proximate their location.

17 Claims, 2 Drawing Sheets

US 8,225,545 B1

LANDSCAPE HEATED COVER APPARATUS

FIELD OF THE INVENTION

The present invention relates to landscaping protection devices, more specifically but not by way of limitation a heated landscaping cover operable to protect a variety of sizes of bushes, plants or trees from sustained environmental temperatures that are at or below the lower tolerance limit for that species of plant

BACKGROUND

Despite ongoing climate change in most global regions, subtropical climate regions, such as the southern region of the United States, have recorded record low temperatures during the last few years. These record low temperatures have not only been for single occurrences but for durations such as entire months. The record low temperatures in theses regions has caused significant damage to the agricultural industry and resulted in lower crop production of temperature sensitive produce such as but not limited to strawberries and oranges. Additionally, homeowners have been forced to replace shrubbery, bushes and other plants, as the local vegetation was unable to withstand the sustained low temperatures.

One problem homeowners encounter is the lack of available products to assist in protecting their plants and trees. When inclimate weather is predicted, many homeowners will utilize spare blankets or tarps as these are the only readily available items that can assist in attempting to protect their plants and trees. Often these items fail for many reasons. When utilizing conventional blankets or tarps, the homeowner is typically unable to substantially cover the plant or tree due to the restricted size of the blanket or tarp. Without being able to substantially cover the plant or tree, the conventional blanket or tarp is ineffective in insulating the plant or tree from the cold temperature. Additionally, frequently during periods of inclimate weather, the winds are increased which creates added problems. Conventional blankets or tarps typically do not have a means wherein the perimeter of the blanket or tarp can be secured to the plant or bush so as to substantially inhibit movement of the blanket or tarp. This often results in the blanket or tarp being blown off the bush or tree that it was intended to insulate thus resulting in the damage or loss of the bush or tree.

Another issue with conventional methods of insulating plants from inclimate weather is the inability to sustain the ground temperature at or above the low temperature tolerance limit of the plant. Utilization of blankets or tarps typically results in only partial insulation of a portion of the plant or tree that is above the ground. During sustained periods of inclimate weather, the ground proximate the plant or tree can reach temperatures that can result in damage to the plant or tree.

Accordingly, there is a need for an apparatus that is operable to protect plant or trees from inclimate weather wherein the apparatus is operable to maintain a temperatures immediate proximate the plant or tree that it is superposed at a level that is at or greater than the lower temperature tolerance limit of the plant or tree. Additionally, it is contemplated within the scope of the present invention that the apparatus further maintains the ground temperature of the ground proximate the plant or tree at a temperature that is at least above the tolerance limit for the plant or tree.

SUMMARY OF THE INVENTION

It is the object of the present invention to provide an apparatus that can be superposed a plant or tree wherein the apparatus is operable to maintain a temperature that is at or above the lowest temperature tolerance limit for the plant or tree in environments that the atmospheric temperature is at or below the lower tolerance limit of the plant or tree.

Another object of the present invention is to provide an apparatus that can be thermostatically adjusted to maintain a temperature that is greater than that of its surroundings.

Yet a further object of the present invention is to provide an apparatus that is operable to be superposed a plant or tree that includes a flexible body configured to adapt to numerous sizes of plants.

Still another object of the present invention is to provide an apparatus that is operable to maintain a temperature that is greater than that of its surroundings while superposed a plant that includes a body having a first layer and a second layer wherein the second layer has a low thermal conductivity.

An additional object of the present invention is to provide an apparatus that is operable to maintain a temperature that is greater than that of its surrounding while being superposed a plant or tree that includes a plurality of heating elements intermediate the first layer and second layer.

A further object of the present invention is to provide an apparatus that is operable to protect plants from inclimate weather by maintaining a temperature that is greater than that of its surroundings, wherein the apparatus is further configured to control the ground temperature proximate the plant or tree that the apparatus is superposed.

Another object of the present invention is to provide an apparatus operable to maintain a temperature immediately proximate a plant or tree that is greater than that of its surroundings wherein the perimeter of the body of the apparatus is configurable to be secured to the plant or tree.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
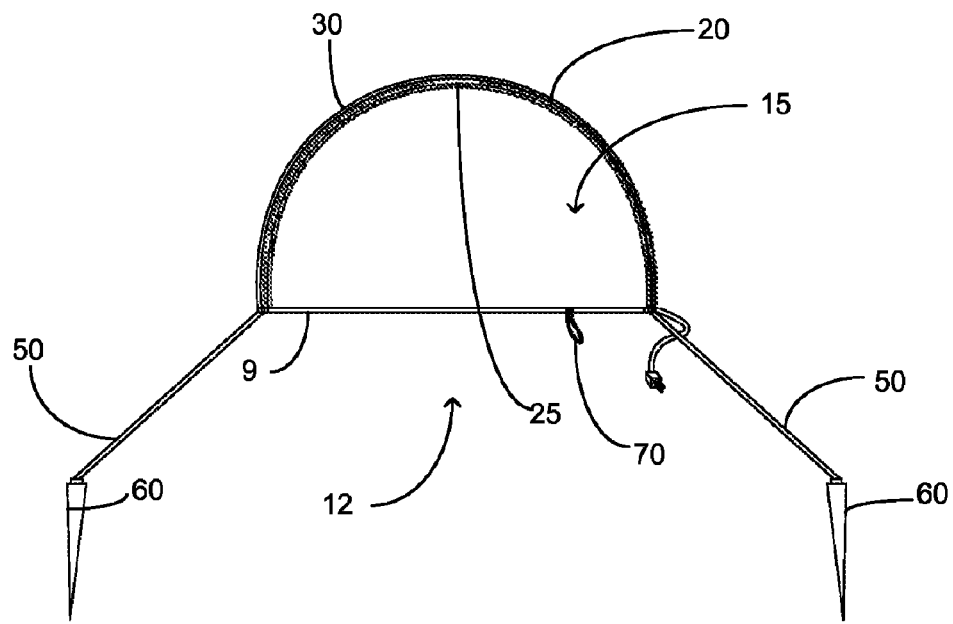
FIG. 1 is a cross-sectional view of the present invention.
Figure 2:
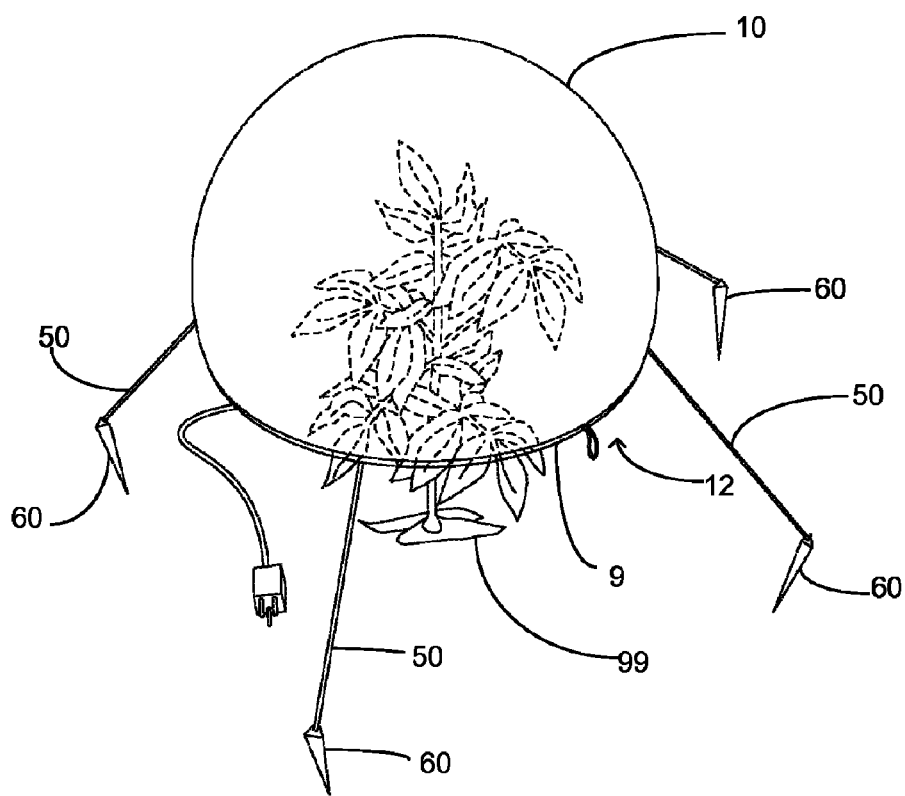
FIG. 2 is a perspective view of the present invention.
Figure 3:
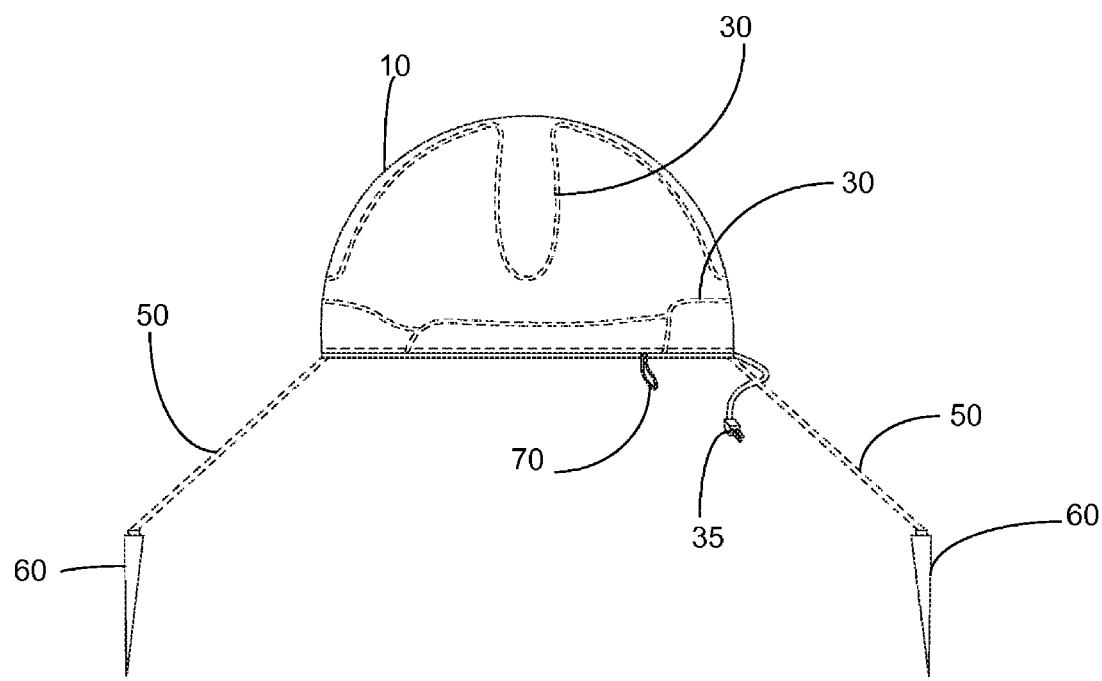
FIG. 3 is a side view of the present invention wherein the heating elements are shown in dotted lines.

Referring now to the drawings submitted herewith, wherein various elements depicted therein are not necessarily drawn to scale and wherein through the views and figures like elements are referenced with identical reference numerals, there is illustrated landscape protection apparatus 100 constructed according to the principles of the present invention.

The landscape protection apparatus 100 includes a body 10 that is manufactured from a durable flexible material such as but not limited to canvas. The body 10 is generally square in shape and has a first position and a second position. In its first position the body 10 is generally planar in manner and can be folded for storage. In its second position, the body 10 is configured to be in a half-dome shape forming an opening 12 that forms a cavity 15 functioning to receive a bush or a tree therein. It is contemplated within the scope of the present invention that the body 10 can be manufactured in numerous different sizes in order to accommodate bushes or trees of various sizes. As shown in particular in FIG. 1, the body 10 further includes a first layer 20 and a second layer 25. The first layer 20 and second layer 25 are joined utilizing a suitable durable technique such as but not limited to stitching. The first layer 20 is the external layer of the body 10 and is manufactured from a suitable durable weatherproof material. Those skilled in the art will recognize that numerous different materials could be utilized to manufacture the first layer 20. The second layer 25 is manufactured from an insulated material so as to assist in maintaining the temperature of the cavity 15 at a temperature that is greater than that of its environmental surroundings. As the landscape protection apparatus 100 function to assist in protect various plants and trees from environmental temperatures that are lower than that of their natural tolerance limit, the second layer 25 assists in that task. The second layer 25 is manufactured from a material that has a low thermal conductivity. It is contemplated within the scope of the present invention that the second layer 25 could be manufactured from a cellulose material of flexible fiberglass material. These materials have relatively low thermal conductivity and would assist in maintaining a temperature within the cavity 15 of the body 10 that is higher than that of its environmental surroundings. Those skilled in the art will recognize that numerous materials could be utilized to manufacture the second layer 25 in order to achieve the functionality as described herein.

Intermediate the first layer 20 and the second layer 25 are a plurality of heating elements 30. The heating elements 30 are distributed across the body 10 in order to provide substantial coverage thereof. It is contemplated within the scope of the present invention that the heating elements 30 could be distributed in numerous different patterns or amounts in order to accomplish the objective described herein. The heating elements 30 are manufactured from a from a flexible metal wire encased in silicon rubber that allows the heating elements 30 to be flexible so as to accommodate any position of the body 10 once it is superposed a bush 99. Those skilled in the art will recognize that numerous types of metal wire could be utilized to construct the heating element 30. The heating element 30 is operable coupled to a power source via connector 35. The connector 35 is a conventional 120/220-volt plug that is designed to couple to a conventional receptacle. While not illustrated herein, it is contemplated within the scope of the present invention that the connector 35 could include a thermostat or other current regulator that would provide the functionality of controlled the temperature range within the cavity 15 once the landscape protection apparatus 100 is operably coupled to a power source. It is further contemplated within the scope of the present invention that heating element 30 could utilize various power sources or a combination thereof. More specifically but not by way of limitation, the heating element 30 could be powered utilizing solar, battery or conventional AC power sources.

Electrically coupled to the heating elements 30 are the support wires 50. The support wires 50 extend from the perimeter 9 of the body 10 and are operably coupled with the stakes 60. The support wires are manufactured from the same material as the heating element 30 having an internal wire with a silicon rubber coating. The support wires 50 electrically couple the stakes 60 with the heating element 30. While four support wires 50 are illustrated herein, it is contemplated within the scope of the present invention that any number of support wires 50 could be secured to the perimeter 9 of the body 10. The support wires 50 function to couple the stakes 60 to the body 10 electrically so as to allow the current from the heating elements 30 to flow to the stakes. Additionally, the support wires 50 function to provide stability for the landscape protection apparatus 100 once it is superposed a bush 99 by physically coupling the stakes 60 with the body 10 wherein the stakes 60 are at least partially inserted into the ground adjacent to the bush 99. The support wires 50 are secured to the perimeter 9 of the body 10 utilizing suitable durable techniques.

The stakes 60 are manufactured from a conductive material such as but not limited to an aluminum alloy. The stakes 60 as previously mentioned herein function to assist in maintaining the position of the landscape protection apparatus 100 subsequent being superposed a bush 99. Additionally, the stakes 60 are manufactured from an aluminum material in order to provide heating of the ground in which the stakes 60 are inserted. The additional heating provided by the stakes 60 assist in maintaining the temperature of the immediate environment of the bush 99 at a temperature that is greater than that of its surroundings. The stakes 60 provide a heat source to the ground adjacent to the bush 99 so as to substantially inhibit the roots of the bush 99 from reaching a temperature that may cause damage or kill the bush 99. It is contemplated within the scope of the present invention that the stakes 60 could be made from numerous types of metal alloys and achieve the desired functionality as described herein.

The perimeter 9 of the body 10 includes a drawstring 70 that is circumferentially mounted to the body 10 proximate the perimeter 9. The drawstring 70 is manufactured from a conventional material such as but not limited to nylon and functions to collapse the perimeter 9 around the bush 9. As the drawstring 9 is engaged and the perimeter 9 is collapsed around a portion of the bush 99, the cavity 15 also decreases in size so as bring the second layer 25 such that it is substantially adjacent the bush 99. While a drawstring 70 is illustrated herein as being utilized to releasably secure the body 10 to a bush 99, it is contemplated within the scope of the present invention that numerous different fasteners could be utilized to releasably secure the body 10 to a bush 99.

Referring in particular to FIG. 1 a description of the operation is as follows. In use, a user will place the body 10 of the landscape protection apparatus 100 such that it is in a substantially planar orientation and superpose the body 10 on a bush 99. The user will then utilize the drawstring 70 to collapse the perimeter 9 of the body 10 around the bush 99. The support wires 50 are extended and the stakes 60 are at least partially inserted into the ground. The connector 35 is then electrically coupled to a suitable power source so as to provide electrical current to the heating elements 30. As the heating elements 30 have an electrical current applied thereto, the heating elements 30 provide heat to the bush 99. The second layer 25 being manufactured of a low thermal conductivity material functions to trap the heat produced by the heating elements 30 such that the temperature within the cavity 15 is greater than that of the environmental temperature of the landscape protection apparatus 100 surroundings. Additionally, as the heating elements 30 are electrically coupled to the support wires 50 and the stakes 60, the stakes function to increase the temperature of the ground proximate their location. The landscape protection apparatus 100 is maintained in position superposed the bush 99 as long as the user desires to substantially inhibit environmental temperatures that may exceed the lower tolerance point of the bush 99 from damaging the bush 99.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A landscape cover comprising:
    a body, said body being generally flexible, said body having a first position and a second position, said body being generally planar in manner in said first position, said body being generally half-domed shape in said second position, said body forming a cavity in said second position, said body being superposed landscaping vegetation in said second position, wherein said body further includes a first layer and a second layer, said first layer and said second layer being comprised of different materials, said first layer and said second layer being securely attached;
    a heating element, said heating element integrally formed with said body, said heating element operable to maintain the temperature of said cavity at a temperature that is at least greater than the environmental surroundings of the landscape cover; and at least one stake, said stake being operably coupled to said body, said stake further being electrically coupled to said heating element, said stake operable to be at least partially inserted into the ground adjacent to the vegetation on which the landscape cover is superposed, said stake further operating to radiate heat.

2. The landscape cover as recited in claim 1, and further including at least one support wire, said support wire electrically coupling said heating element to said stake, said support wire further operable to secure said stake to said body.

3. The landscape cover as recited in claim 2, wherein said first layer of said body is manufactured from a weatherproof material.

4. The landscape cover as recited in claim 3, wherein said second layer of said body is manufactured from a material having a low thermal conductivity.

5. The landscape cover as recited in claim 4, and further including a drawstring, said drawstring secured around the perimeter of said body, said drawstring operable to assist in releasably securing said body to the vegetation.

6. A landscape cover operable to be superposed a plant comprising:
    a body, said body being generally flexible, said body having a first layer and a second layer, said first layer and said second layer being substantially equivalent in size, said first layer and said second layer being secured to each other, said body having a first position and a second position, said body being generally planar in manner in said first position, said body being generally half-domed shape in said second position, said body forming a cavity in said second position, said cavity being of suitable volume to receive at least a portion of a plant therein, said body being superposed landscaping vegetation in said second position;
    a heating element, said heating element integrally formed with said body, said heating element distributed substantially across said body, said heating element being intermediate said first layer and said second layer,
    wherein said heating element operable to maintain the temperature of said cavity at a temperature that is at least greater than the environmental surroundings of the landscape cover; and a plurality of support wires, said plurality of support wires extending from the perimeter of said body, said plurality of support wires being electrically coupled to said heating element.

7. The landscape cover as recited in claim 6, and further including a plurality of stakes, said stakes being coupled to said plurality of support wires distal to said body, said plurality of stakes operable to be at least partially inserted into the ground adjacent the plant.

8. The landscape cover as recited in claim 7, wherein said plurality of stakes are manufactured from a conductive material, said plurality of stakes being electrically coupled to said heating element, said plurality of stakes operable to increase the temperature of the ground proximate thereto.

9. The landscape cover as recited in claim 8, wherein said first layer is the outer layer of said body, said first layer being manufactured from a weatherproof material.

10. The landscape cover as recited in claim 9, wherein said second layer is manufactured from an insulated material having a low thermal conductivity.

11. The landscape cover as recited in claim 10, wherein said body further includes a securing mechanism, said securing mechanism being attached to the perimeter of said body, said securing mechanism operable to assist in releasably securing said body to the plant.

12. A plant cover operable to provide an environment immediately adjacent the plant wherein the temperature is greater than that of the temperature of the surroundings comprising:
    a body, said body being generally flexible, said body having a first layer and a second layer, said first layer and said second layer being substantially equivalent in size, said first layer and said second layer being secured to each other, said body having a first position and a second position, said body being generally planar in manner in said first position, said body being generally half-domed shape in said second position, said body forming a cavity in said second position, said cavity being of suitable volume to receive at least a portion of a plant therein, said body being superposed a plant in said second position;
    a heating element, said heating element integrally formed with said body, said heating element distributed substantially across said body, said heating element being intermediate said first layer and said second layer;
    a plurality of stakes, said stakes operably coupled to said body, said stakes further being electrically coupled to said heating element, said stakes having a first mode and a second mode, said stakes operable to secure the landscape cover to the ground in said first mode, said stakes operable to increase the temperature of the ground adjacent thereto in said second mode; and
    wherein said heating element operable to maintain the temperature of said cavity at a temperature that is at least greater than the environmental surroundings of the plant cover.

13. The plant cover as recited in claim 12, and further including a plurality of support wires, said support wires having a first end and a second end, said first end being coupled to said body and electrically connected to said heating element, said second end being operably coupled to said plurality of stakes.

14. The plant cover as recited in claim 13, wherein said first layer is the outer layer of said body, said first layer being manufactured from a weatherproof material.

15. The plant cover as recited in claim 14, wherein said second layer is manufactured from an insulated material having a low thermal conductivity.

16. The plant cover as recited in claim 15, wherein said body further includes a securing mechanism, said securing mechanism being attached to the perimeter of said body, said securing mechanism operable to assist in releasably securing said body to the plant.

17. The plant cover as recited in claim 16, wherein said securing mechanism is a drawstring.

* * * * *